United States Patent [19]

Quarles et al.

[11] Patent Number: 4,730,118
[45] Date of Patent: Mar. 8, 1988

[54] OIL FIELD INDUCTION GENERATOR SYSTEM

[75] Inventors: Malcolm H. Quarles, Houston; William D. Bolin, Katy, both of Tex.

[73] Assignee: James D. Barnes, Shreveport, La.

[21] Appl. No.: 85,257

[22] Filed: Aug. 11, 1987

Related U.S. Application Data

[63] Continuation of Ser. No. 014,110, Feb. 3, 1987, abandoned, which is a continuation of Ser. No. 881,517, Jun. 30, 1986, abandoned, which is a continuation of Ser. No. 803,513, Dec. 2, 1985, abandoned, which is a continuation of Ser. No. 477,215, Mar. 21, 1983, abandoned.

[51] Int. Cl.$^4$ .............................................. H02P 9/04
[52] U.S. Cl. .................................. 290/40 R; 290/40 A; 290/40 B; 290/40 C; 307/57; 322/23; 322/24; 60/711
[58] Field of Search .................. 290/1 R, 1 A, 40 R, 290/40 A, 40 B, 40 C, 40 D, 40 E, 40 F, 31, 32, 36 R, 46, 51, 52; 322/20, 23, 24, 25, 28, 29, 31, 32, 33, 34, 42, 47, 62, 38, 14, 15, 2 R; 307/43, 47, 57, 68, 76, 78, 84; 60/641.2–641.5, 711

[56] References Cited

U.S. PATENT DOCUMENTS

| | | | |
|---|---|---|---|
| 1,036,328 | 9/1912 | Pierce | 19/55 R |
| 2,059,830 | 11/1936 | Warner | 60/711 X |
| 2,096,289 | 10/1937 | Palmer | 290/31 |
| 2,180,144 | 11/1939 | Gieseler | 60/711 X |
| 2,725,825 | 12/1955 | Gibattari | 417/374 X |
| 2,832,030 | 4/1958 | Fairweather | 322/23 |
| 3,076,922 | 2/1963 | Seike | 322/25 X |
| 3,110,817 | 11/1963 | Frederick | 322/24 X |
| 3,287,565 | 11/1966 | Lewis | 290/40 R |
| 3,305,723 | 2/1967 | Maine et al. | 290/40 R |
| 3,342,999 | 9/1967 | Townsend | 290/40 R |
| 3,621,370 | 11/1971 | Thomos | 322/23 |
| 3,634,750 | 1/1972 | Bobo | 322/20 |
| 3,646,356 | 2/1972 | Hoffman | 307/57 X |
| 3,665,495 | 5/1972 | Carter et al. | 290/4 R X |
| 3,777,174 | 12/1973 | Butscher et al. | 290/40 |
| 3,794,846 | 2/1974 | Schlicher et al. | 322/24 X |
| 3,878,400 | 4/1975 | McSparran | 322/23 X |
| 3,898,969 | 8/1975 | Williams et al. | 290/40 A X |
| 4,027,483 | 6/1977 | Wahl, III | 60/641.2 |
| 4,043,129 | 8/1977 | McCabe et al. | 60/641.2 |
| 4,057,736 | 11/1977 | Jeppson | 307/78 |
| 4,117,344 | 9/1978 | Boerstler et al. | 290/52 |
| 4,136,286 | 1/1979 | O'Halloran et al. | 290/40 C |
| 4,184,083 | 1/1980 | Takeuchi | 290/40 C |
| 4,185,203 | 1/1980 | Takeuchi | 290/40 C |
| 4,217,617 | 8/1980 | Rossi et al. | 290/40 A X |
| 4,219,738 | 8/1980 | Griesinger | 290/40 R |
| 4,290,266 | 9/1981 | Twite et al. | 60/641.2 |
| 4,307,690 | 12/1981 | Rau et al. | 290/40 R X |
| 4,343,999 | 8/1982 | Wolf | 60/641.2 X |
| 4,349,744 | 9/1982 | Reuther et al. | 290/40 C |
| 4,358,930 | 11/1982 | Pope et al. | 60/641.2 X |
| 4,417,194 | 11/1983 | Curtiss et al. | 290/40 B X |
| 4,423,307 | 12/1983 | Kondo et al. | 290/40 C X |

OTHER PUBLICATIONS

Induction Generator New Wrinkle for On-Site Power by Joe Kane, (pp. 34-35, Feb. 1981).

*Primary Examiner*—William M. Shoop, Jr.
*Assistant Examiner*—Paul Ip
*Attorney, Agent, or Firm*—L. Dan Tucker

[57] ABSTRACT

An induction generator system is disclosed for utilization with an oil producing well having casing gas available at the wellhead and an existing electrical power system. An electric motor is coupled to the existing electrical power system and is utilized as a generator to drive a submersible pump or other electrical load. A gas engine which is powered by the casing gas is mechanically coupled to the electric motor by means of a drive belt and is utilized to drive the electric motor at a speed greater than the synchronous speed of the motor. While the electric motor is driven at a speed greater than its synchronous speed it will generate electrical energy which can be utilized to carry the electrical load. A novel control system is utilized to control the operation of the engine/motor generator system in response to variations in motor speeds, engine operating parameters and load/voltage conditions.

22 Claims, 1 Drawing Figure

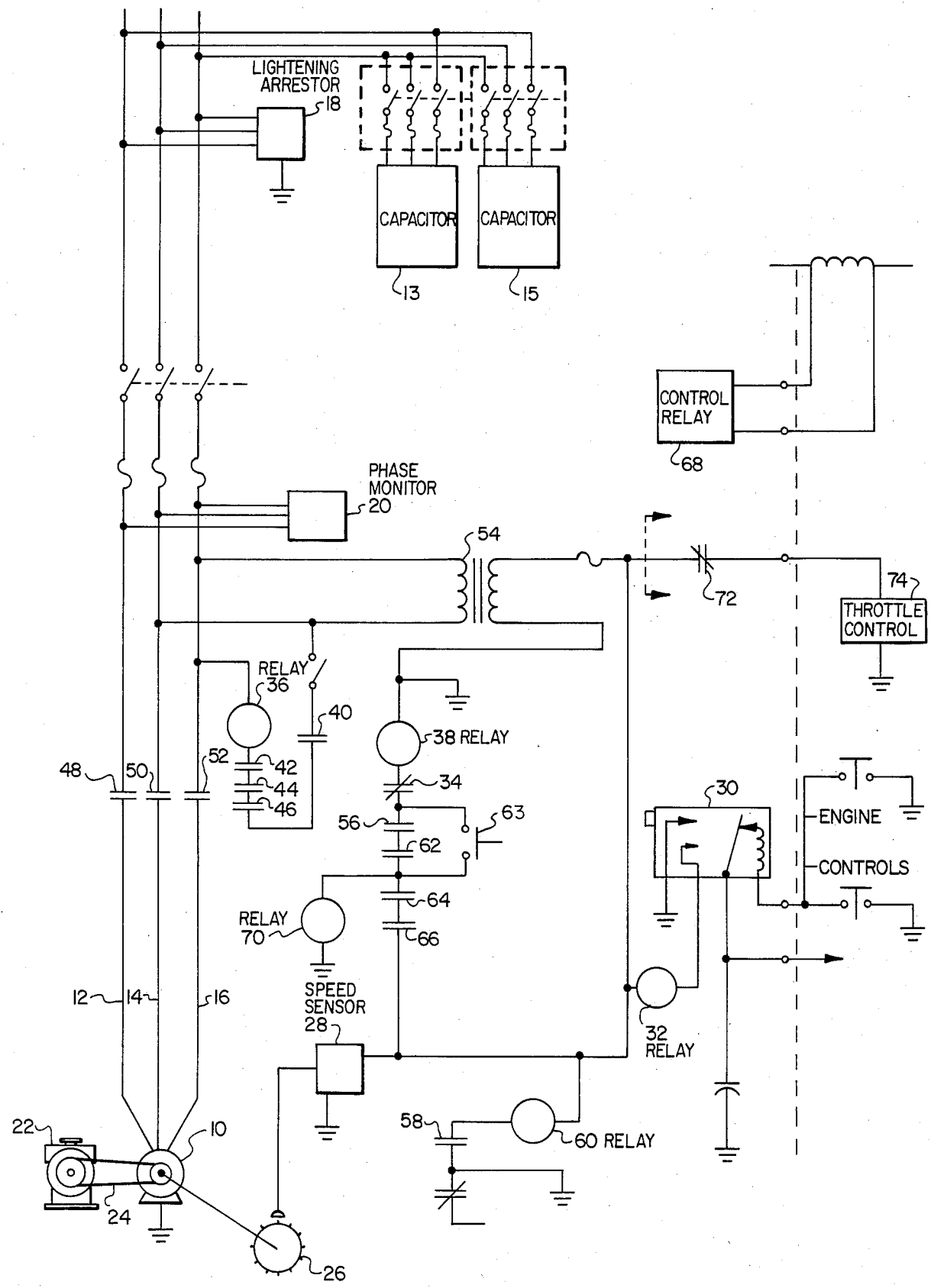

OIL FIELD INDUCTION GENERATOR SYSTEM

This application is a continuation of application Ser. No. 014,110, filed 2/3/87, which is a continuation of Ser. No. 881,517, filed 6/30/86, which is a continuation of Ser. No. 803,513, filed 12/2/85, which is a continuation of Ser. No. 477,215, filed on 3/21/83, all abandoned.

BACKGROUND OF THE INVENTION

This invention relates to electrical power generation systems in general and in particular to electrical power generation systems which are suitable for utilization in oilfield applications.

In the prior art there are many methods utilized to perform the work of removing oil and other petrochemical deposits from pools or reservoirs beneath the earth's surface. These methods typically include submersible pumps, pumpjacks and other methods of lifting fluid from beneath the surface. These devices are generally operated utilizing either electric power from an existing electrical power distribution system or by an internal combustion engine powered by gasoline or in some cases by the casing gas present in the wellhead in certain wells.

Each of these known methods has its advantages and disadvantages. For example, electrically powered systems are generally reliable and will effectively lift fluid from beneath the earth's surface as long as electric power is available. However, the cost of generating electrical power is rapidly increasing and the amount necessary to operate a large number of oilfield pumps can generate an extremely high utility bill.

In those applications in which casing gas is present in the wellhead, it is sometimes efficient to utilize this gas to power an internal combustion engine to drive a pump or generator; however, the variations in flow, pressure and availability of casing gas result in this method being not a dependable source of energy. With such systems periods of low pressure may result in downtime during which no oil is pumped from the well.

Therefore, there exists a need for a power generation system which combines the economic advantages of the gas engine system with the relative reliability of the electrical systems.

SUMMARY OF THE INVENTION

Accordingly, it is one object of the present invention to provide an improved method and apparatus for powering the removal of oil from beneath the surface of the earth;

It is another object of the present invention to provide an induction generator system which can be safely and easily operated in parallel with an existing electrical power distribution system;

It is still another object of the present invention to provide an induction generator system which can be powered by a gas engine fueled by casing gas from the wellhead;

It is another object of the present invention to provide an induction generator system which is powered by a gas engine fueled by casing gas from the wellhead which can be controlled in response to variations in the operation of the gas engine;

It is yet another object of the present invention to provide an induction generator system which is powered by a gas engine fueled by casing gas from the wellhead which can be controlled in response to variations in the electrical load.

The foregoing objects are achieved as is now described. An electric motor is coupled to the existing electrical power system and is utilized as a generator to drive a submersible pump or other electrical load. A gas engine which is powered by the casing gas is mechanically coupled to the electric motor by means of a drive belt and is utilized to drive the electric motor at a speed greater than the synchronous speed of the motor. While the electric motor is driven at a speed greater than its synchronous speed it will generate electrical energy which can be utilized to carry the electrical load. A novel control system is utilized to control the operation of the engine/motor generator system in response to variations in motor speeds, engine operating parameters and load/voltage conditions.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawing, wherein:

The lone FIGURE depicts a partially diagrammatic and partially schematic view of the novel induction generator system of the present invention.

DETAILED DESCRIPTION OF THE INVENTION

Referring now to the FIGURE, there is depicted a partially diagrammatic and partially schematic view of the novel induction generator system of the present invention.

Electric motor 10 is connected to an existing electrical power distribution system by means of lines 12, 14 and 16 in a manner well known in the art. In a preferred embodiment of the present invention, electric motor 10 is a 125 horsepower, 1800 RPM electric motor manufactured by any of a number of electric motor manufacturers. In the depicted embodiment of the present invention, a standard lightning arrestor 18 is coupled to lines 12, 14 and 16 to protect the circuitry of the present invention from possible damage due to lightning strikes. Further, a phase monitor 20, such as the Time Mark Model No. C269 is also coupled to lines 12, 14 and 16 to monitor the phase and voltage of the electrical energy present on those lines.

A gas engine 22 is mechanically coupled to electric motor 10 by means of V-belt drive 24. In a preferred embodiment of the present invention, V-belt drive 24 utilizes sized pulleys which are chosen so that gas engine 22 will drive electric motor 10 at a speed in excess of its synchronous speed. As is common in this art, gas engine 22 may be fueled utilizing the casing gas present at the wellhead. In many such installations, this casing gas would ordinarily be vented, flared or otherwise wasted, making casing gas a very economical fuel for such engines.

Coupled to electric motor 10, either directly or by means of a shaft, is speed indicator 26 which is utilized in conjunction with solid state speed sensor 28 to monitor the rotational speed of electric motor 10. This is particularly relevant, as those skilled in the electrical art will appreciate, in that when driven at a speed in excess of its synchronous speed, electric motor 10 will generate electrical energy which can be utilized to carry an electrical load, such as a submersible pump. The utilization of an induction device such as electric motor 10 is particularly useful in that it will not be necessary to accurately control the frequency and voltage of motor 10, as it would be with an ordinary generator. The frequency and voltage of the electrical energy generated by overspeeding electric motor 10 will be determined by the frequency and voltage of the existing electrical power distribution system, which is coupled to the stator of electric motor 10. Thus, the gas engine/electric motor generator system of the present invention may be easily utilized to generate electrical power without the constraints necessary with normal generator systems. Power factor correction for the electrical energy generated by electric motor 10 is provided utilizing capacitors 13 and 15. The size of capacitors 13 and 15 must be chosen based upon the amount of power utilized in a particular installation and those ordinarily skilled in the art will appreciate that various sized capacitors may be utilized in this fashion.

A complex control system is utilized in conjunction with gas engine 22 and electric motor 10 to ensure that the system will react to all possible problems which might ordinarily be encountered during operation. The operation of gas engine 22 is monitored utilizing a Murphy Model 307PH engine "tattletale" monitoring device 30. Engine monitoring device 30 is a standard engine monitoring device which is manufactured by the Frank W. Murphy Company of Tulsa, Okla. and is coupled to gas engine 22 and utilized in conjunction with control relay 32. Monitoring device 30 is utilized to monitor engine faults, engine temperatures and engine oil pressures, in a manner well known in the art. If a malfunction of gas engine 22 is detected by monitoring device 30, control relay 32 is utilized to operate relay contacts 34, which will remove power from contactor coil 36 of electric motor 10. This is accomplished by de-energizing control relay 38 which operates relay contacts 40, removing power from contactor coil 36. Additionally, overload contacts 42, 44 and 46 can also be utilized to remove power from contactor coil 36, which will result in electric motor 10 being disconnected from the existing electrical power distribution system at motor contacts 48, 50 and 52.

Additionally, various other control relays and contacts are utilized in the secondary circuit of transformer 54 to monitor the operation of the gas engine/electric motor generator system of the present invention. Included among these are relay contacts 56 and 58 which are operated by solid state speed sensor 28. These relay contacts are utilized to remove power from contactor coil 36 in the event of electric motor 10 increasing its speed to a level above a first selected speed, or decreasing its speed to a level below a second selected speed. A second control relay 60 is utilized in the depicted embodiment of the present invention to generate a fixed time delay after the speed of electric motor 10 has decreased to a selected level to prevent minor, temporary drops in speed due to casing gas pressure variations from affecting the generator system. Relay contacts 62 are controlled by time delay control relay 60. As can be seen, a start button 63 can be utilized to temporarily remove relay contacts 56 and 62 from the circuit during startup.

Two final pairs of relay contacts are utilized to control the application of power to contactor coil 36. Relay contacts 64 are controlled by phase monitor 20 and can be utilized to remove power from contactor coil 36 in the event of insufficient or excessive voltage or phase related problems. Relay contacts 66 are operated by control relay 68 which is utilized to monitor the existing electrical power distribution system. This is necessary, since a loss of power in the existing electrical power distribution system could result in the electrical energy being generated by this system being coupled into the existing electrical power distribution system lines. This is a possible shock hazard to repair crews who believe the system to be de-energized.

The final section of the novel control system of the present invention includes a control relay 70 which is operated in the event of relay contacts 64 or 66 opening. Control relay 70 then operates through relay contact 72 to operate throttle control device 74 to cause gas engine 22 to slow to its idle speed. By utilizing this approach, the system may be automatically restarted after a phase, voltage or line problem has been corrected.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An induction generator system for powering an electric pump at an oil producing well having gas available at the wellhead and an existing electrical power distribution system, said generator system comprising:
    an electrical motor coupled to an existing electrical power distribution system and designed to rotate at a selected synchronous speed in response to application of said electrical power;
    a gas engine fueled by said gas and mechanically coupled to drive said electrical motor at a speed in excess of said selected synchronous speed whereby said electrical motor will generate electrical energy into an electrical load; and,
    control means for coupling said existing electrical power distribution system to said electric pump in the absence of sufficient gas at said wellhead to drive said gas engine and for coupling the electrical energy generated by said electrical motor to said existing electrical power distribution system when sufficient gas is available at said wellhead to drive said gas engine.

2. The induction generator system according to claim 1 wherein said control means further includes a solid state speed sensor.

3. The induction generator system according to claim 2 wherein said control means includes means for shutting off said gas engine in response to the speed of said electric motor exceeding a first selected speed.

4. The induction generator system according to claim 2 wherein said control means further includes means for shutting off said gas engine in response to the speed of said electric motor falling below a second selected speed.

5. The induction generator system according to claim 4 wherein said control means further includes means for delaying for a particular period of time the shutting off of said gas engine in response to the speed of said electric motor falling below said second selected speed.

6. The induction generator system according to claim 1 wherein said gas engine is mechanically coupled to said electrical motor by means of a V-belt drive.

7. The induction generator system according to claim 1 wherein said control means further includes means for monitoring the temperature of said gas engine.

8. The induction generator system according to claim 1 wherein said control means further includes means for monitoring the state of lubrication of said gas engine.

9. The induction generator system according to claim 1 wherein said control means further includes throttle control means coupled to said gas engine and means for causing gas engine to run at idle speed in response to the voltage generated by said electrical motor exceeding a first selected level.

10. The induction generator system according to claim 1 wherein said control means further includes throttle control means coupled to said gas engine and means for causing said gas engine to run at idle speed in response to the voltage generated by said electrical motor falling below a second selected level.

11. The induction generator system according to claim 1 wherein said control means further includes means for monitoring said existing electrical power distribution system and for shutting off said gas engine in response to said power loss in said existing electrical power distribution system.

12. An induction generator system for powering an electric load at a location where fuel is available to power a prime mover and at a location having an existing electrical power distribution system, said generator system comprising:

an electrical motor coupled to an existing electrical power distribution system and designed to rotate at a selected synchronous speed in response to application of said electrical power;

a prime mover fueled by said fuel and mechanically coupled to drive said electric motor at a speed in excess of said selected synchronous speed whereby said electric motor will generate electrical energy into said electric load; and, control means for coupling said existing electrical power distribution system to said electrical load in the absence of sufficient fuel to drive said prime mover at a speed sufficient to rotate said electric motor above its synchronous speed and for coupling the electrical energy generated by said electric motor to said existing electrical power distribution system when sufficient fuel is available to drive said prime mover at a speed sufficient to rotate said electric motor above its synchronous speed, said control means includes a speed sensor adapted to monitor the rotational speed of said electric motor and means to couple said electrical power distribution system to said electric load and means to couple said electric motor to said electrical power distribution system responsive to the speed of rotation of said electric motor which is sensed by said speed sensor.

13. The induction generator system according to claim 12 wherein said speed sensor is a solid state speed sensor.

14. The induction generator system according to claim 13 wherein said control means includes means for shutting off said prime mover in response to the speed of said electric motor exceeding a first selected speed.

15. The induction generator system according to claim 13 wherein said control means further includes means for shutting off said prime mover in response to the speed of said electric motor falling below a second selected speed.

16. The induction generator system according to claim 15 wherein said control means further includes means for delaying for a particular period of time the shutting off of said prime mover in response to the speed of said electric motor falling below said second selected speed.

17. The induction generator system according to claim 12 wherein said prime mover is mechanically coupled to said electric motor by means of a V-belt drive.

18. The induction generator system according to claim 12 wherein said control means further includes means for monitoring the temperature of said prime mover.

19. The induction generator system according to claim 12 wherein said control means further includes means for monitoring the state of lubrication of said prime mover.

20. The induction generator system according to claim 12 wherein said control means further includes throttle control means coupled to said prime mover and means for causing said prime mover to run at idel speed in response to the voltage generated by said electric motor exceeding a first selected level.

21. The induction generator system according to claim 12 wherein said control means further includes throttle control means coupled to said prime mover for causing said prime mover to run at idel speed in response to the voltage generated by said electric motor falling below a second selected level.

22. The induction generator system according to claim 12 wherein said control means further includes means for monitoring said existing electrical power distribution system and for shutting off said prime mover in response to said power loss in said existing electrical power distribution system.

* * * * *